US009154733B2

(12) United States Patent
Ahuja et al.

(10) Patent No.: US 9,154,733 B2
(45) Date of Patent: Oct. 6, 2015

(54) EXTERNAL ROUNDTRIP LATENCY MEASUREMENT FOR A COMMUNICATION SYSTEM

(71) Applicants: Sudhir R. Ahuja, Murray Hill, NJ (US); Vatsan Rajagopalan, Murray Hill, NJ (US); Joseph Quanaim, Murray Hill, NJ (US); Dong Liu, Murray Hill, NJ (US); Boyd T. Mathews, Murray Hill, NJ (US)

(72) Inventors: Sudhir R. Ahuja, Murray Hill, NJ (US); Vatsan Rajagopalan, Murray Hill, NJ (US); Joseph Quanaim, Murray Hill, NJ (US); Dong Liu, Murray Hill, NJ (US); Boyd T. Mathews, Murray Hill, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 333 days.

(21) Appl. No.: 13/832,842

(22) Filed: Mar. 15, 2013

(65) Prior Publication Data
US 2014/0267561 A1     Sep. 18, 2014

(51) Int. Cl.
| | |
|---|---|
| *H04N 7/14* | (2006.01) |
| *H04N 7/15* | (2006.01) |
| *H04L 12/18* | (2006.01) |
| *H04L 12/26* | (2006.01) |
| *H04N 17/00* | (2006.01) |
| *H04L 29/06* | (2006.01) |

(52) U.S. Cl.
CPC ............ *H04N 7/15* (2013.01); *H04L 12/1827* (2013.01); *H04L 43/0864* (2013.01); *H04L 65/80* (2013.01); *H04N 17/004* (2013.01)

(58) Field of Classification Search
CPC ..... H04M 2203/50–2203/509; H04L 43/0864; H04L 12/16–12/1895; H04L 65/80
USPC .............. 348/14.01–14.16; 370/259–271, 370/351–357; 709/201–207, 217–248
See application file for complete search history.

(56) References Cited

U.S. PATENT DOCUMENTS

| | | | | |
|---|---|---|---|---|
| 7,796,650 | B2 * | 9/2010 | Boyes et al. | 370/493 |
| 7,916,653 | B2 * | 3/2011 | Firestone et al. | 370/252 |
| 2006/0029037 | A1 | 2/2006 | Chen et al. | |

OTHER PUBLICATIONS

PCT International Search Report and Written Opinion of PCT/US2014/019785, dated Jun. 13, 2014, pp. 1-12.
Shimizu T. et al., "International real-time streaming of 4K digital cinema", Future Generations Computer Systems, Elsevier Science Publishers, Amsterdam, NL, vol. 22, No. 8, Oct. 1, 2006. pp. 929-939.
Pracht S. et al., "Voice Quality in Converging Telephone and IP Networks Technologies", Oct. 30, 2001, pp. 1-20.

* cited by examiner

*Primary Examiner* — Hemant Patel
(74) *Attorney, Agent, or Firm* — Wall & Tong, LLP

(57) ABSTRACT

An external capability for measuring roundtrip latency in a conferencing system is provided. The external capability for measuring roundtrip latency in a communication system may include functions of generating a content event, detecting the content event in a received content stream including the content event, determine a first time associated with generation of the content event and a second time associated with detection of the content event, and computing a roundtrip latency based on a difference between the second time and the first time. The content event may be a visual event or an aural event. These functions may be implemented using one or more modules or elements. A computing device may be used to generate and detect the content event and to compute the roundtrip latency. Various other arrangements of modules or elements may be used to provide the functions.

19 Claims, 8 Drawing Sheets

EXTERNAL ROUNDTRIP LATENCY MEASUREMENT FOR A COMMUNICATION SYSTEM

TECHNICAL FIELD

The disclosure relates generally to conferencing systems and, more specifically but not exclusively, to measurement of roundtrip latencies in conferencing systems.

BACKGROUND

Many video conferencing systems are prevalent for use in meetings for enterprises. Such video conferencing systems are typically room-to-room or station-to-station video conferencing systems. Additionally, the use of video calls (e.g., via tablet computers, smartphones, and like devices) continues to increase. In many communication systems, latency within the communication system may result in an unpleasant experience for users of services in the communication system. For example, latency in a conferencing service that is supported by a communication system may result, at best, in an experience that may be unpleasant for the users of the conferencing service and, in the worst case, in a conferencing service that may be unusable by the users.

SUMMARY OF EMBODIMENTS

Various deficiencies in the prior art may be addressed by embodiments for measuring roundtrip latency in a communication system.

In one embodiment, an apparatus includes at least one module, a processor, and a memory. The at least one module is configured to generate a content event and detect the content event in a received content stream including the content event. The processor and memory are configured to determine a first time associated with generation of the content event and a second time associated with detection of the content event, and compute a roundtrip latency based on a difference between the second time and the first time.

In one embodiment, a computer-readable storage medium stores instructions which, when executed by a processor, cause the processor to perform a method that includes generating a content event, detecting the content event in a received content stream including the content event, determining a first time associated with generation of the content event and a second time associated with detection of the content event, and computing a roundtrip latency based on a difference between the second time and the first time.

In one embodiment, an apparatus includes a processor and a memory communicatively connected to the processor, the processor configured to receive an audio stream including an aural event having a first set of aural characteristics, detect the aural event within the received audio stream, process the aural event for modifying the first set of aural characteristics to produce a second set of aural characteristics, and output the aural event having the second set of aural characteristics.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EMBODIMENTS

In general, an external roundtrip latency measurement capability is provided. In at least some embodiments, the external roundtrip latency measurement capability may be used to measure the roundtrip latency of media exchanged between two endpoints of a media conferencing system. The media supported by the media conferencing system may include video content, audio content, multimedia content, or the like. The measurement of the roundtrip latency may be considered to be external at least in the sense that it does not requirement any modifications to the media conferencing system. Various embodiments of the external roundtrip latency measurement capability may be better understood by considering an exemplary multimedia conferencing system.

Figure 1:
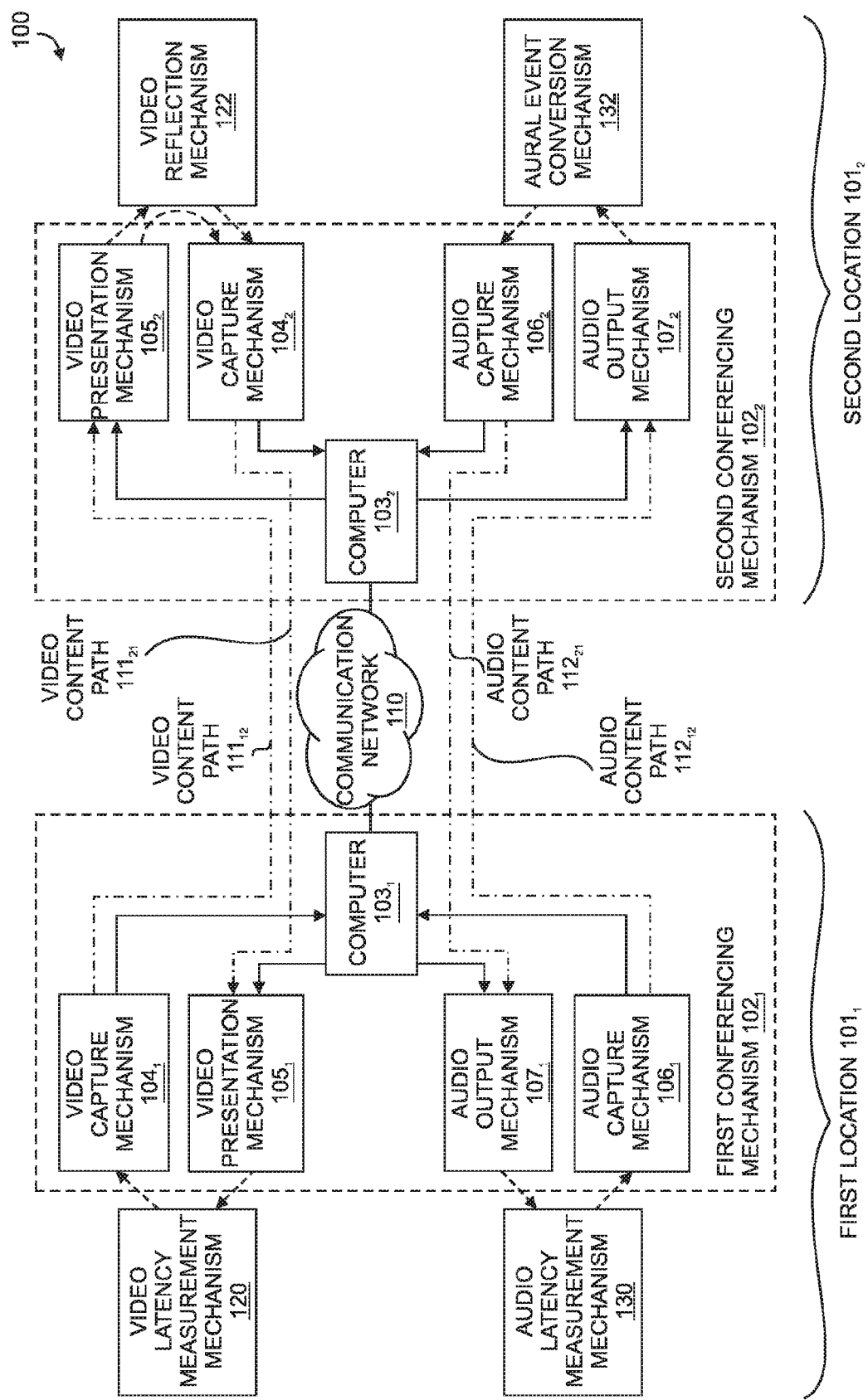
FIG. 1 depicts an exemplary multimedia conferencing system and exemplary embodiments for measurement of roundtrip latency within the exemplary multimedia conferencing system.

FIG. 1 depicts an exemplary multimedia conferencing system and exemplary embodiments for measurement of roundtrip latency within the exemplary multimedia conferencing system.

The exemplary multimedia conferencing system 100 includes a first location $101_1$ and a second location $101_2$ (collectively, locations 101) which are communicatively connected via a communication network 110. The locations 101 include respective equipment for supporting a multimedia conference, including video content and audio content, between the locations 101. The communication network 110 may include any suitable type of communication network(s) via which multimedia conferencing may be performed (e.g., a Public Switched Telephone Network (PSTN), a data network supporting Internet Protocol (IP), or the like, as well as various combinations thereof).

The first location $101_1$ includes a first conferencing mechanism $102_1$ and, similarly, the second location $101_2$ includes a second conferencing mechanism $102_2$. The first conferencing mechanism $102_1$ and second conferencing mechanism $102_2$ (collectively, conferencing mechanisms 102) cooperate to support a multimedia conference between the locations 101. The first conferencing mechanism $102_1$ includes a computer $103_1$ communicatively connected to each of a video capture mechanism $104_1$, a video presentation mechanism $105_1$, an audio capture mechanism $106_1$, and an audio output mechanism $107_1$. Similarly, the second conferencing mechanism $102_2$ includes a computer $103_2$ communicatively connected to each of a video capture mechanism $104_2$, a video presentation mechanism $105_2$, an audio capture mechanism $106_2$, and an audio output mechanism $107_2$.

The computers $103_1$ and $103_2$, which may be referred to collectively as computers 103, may be any suitable types of computing devices configured to support video conferencing and audio conferencing between locations 101. For example, the computers 103 may include, respectively, one or more processors, one or more memories, one or more input-output interfaces, or the like, as well as various combinations thereof. The computers 103 support various capabilities for providing video conferencing and audio conferencing between locations 101. For example, the computers 103 may support content encoding and decoding processes (e.g., video encoding and decoding processes, audio encoding and decoding processes, or the like), content packetization (e.g., packetization of video frames, packetization of audio frames, or the like), network interfaces and protocols for relaying content frames to and receiving content frames from communication network 110, or the like. The computers 103 may include various other elements (e.g., processors, memory, interfaces, protocols, or the like, as well as various combinations thereof). It will be appreciated that, although primarily depicted and described with respect to use of computers 103 to provide such capabilities for supporting video conferencing and audio conferencing between locations 101, such capabilities for supporting video conferencing and audio conferencing between locations 101 may be provided using any suitable types of hardware.

The video capture mechanisms $104_1$ and $104_2$, which may be referred to collectively as video capture mechanisms 104, may be video cameras or any other suitable type(s) of mechanism(s) for capturing video at the respective locations 101. The video presentation mechanisms $105_1$ and $105_2$, which may be referred to collectively as video presentation mechanisms 105, may be computer monitors, television screens, tablet screens, or any other suitable type(s) of mechanism(s) for presenting video at the respective locations 101. The typical operation of video capture mechanisms 104 and video presentation mechanisms 105 within the context of video conferencing will be understood by one skilled in the art.

The audio capture mechanisms $106_1$ and $106_2$, which may be referred to collectively as audio capture mechanisms 106, may be microphones or any other suitable type(s) of mechanism(s) for capturing audio at the respective locations 101. The audio output mechanisms $107_1$ and $107_2$, which may be referred to collectively as audio output mechanisms 107, may be speakers or any other suitable type(s) of mechanism(s) for playing audio at the respective locations 101. The typical operation of audio capture mechanisms 106 and audio output mechanisms 107 within the context of audio conferencing will be understood by one skilled in the art.

The conferencing mechanisms 102 may be implemented using one or more devices, respectively. For example, a conferencing mechanism 102 may be a computing device having a plurality of peripheral devices communicatively connected thereto (e.g., a computer tower having a camera, a computer monitor, a microphone, and a speaker, at least some of which may be connected as peripheral devices of the computer tower). For example, a conferencing mechanism 102 may be a device having various conferencing mechanisms integrated therein (e.g., a tablet computer having a camera, a display, a microphone, and a speaker integrated therein, a smartphone having a camera, a display, a microphone, and a speaker integrated therein, or the like). The conferencing mechanisms 102 may be implemented using any other suitable numbers and types of elements connected in any other suitable manner.

The conferencing mechanisms 102 support a multimedia conference between the locations 101. It is noted that, while the typical operation of the conferencing mechanisms 102 in supporting a multimedia conference between the locations 101 will be understood by one skilled in the art, a brief overview of multimedia conferencing capabilities of conferencing mechanisms 102 is provided.

The conferencing mechanisms 102 are configured to support video conferencing between the locations 101. The conferencing mechanisms 102 support video conferencing in a manner for providing video content from the first location $101_1$ to the second location $101_2$. The video capture mechanism $104_1$ captures video content at the first location $101_1$ and provides the captured video content to computer $103_1$. The computer $103_1$ encodes the video content, packetizes the encoded video content, and transmits the packetized encoded video content toward the second location $101_2$ via communication network 110. The computer $103_2$ receives the packetized encoded video content from computer $103_1$ via communication network 110. The computer $103_2$ de-packetizes the packetized encoded video content, decodes the encoded video content, and propagates the video content toward video presentation mechanism $105_2$ for presentation of the video at second location $101_2$. This is depicted in FIG. 1 as video content path $111_{12}$. The conferencing mechanisms 102 also support video conferencing in a manner for providing video content from the second location $101_2$ to the first location $101_1$ using a process mirroring that described for providing video content from the first location $101_1$ to the second location $101_2$ (namely, video content captured by video capture mechanism $104_2$ is propagated to video presentation mechanism $105_1$ via computer $103_2$, communication network 110, and computer $103_1$). This is depicted in FIG. 1 as video content path $111_{21}$. The video content path $111_{12}$ and the video content path $111_{21}$ represent a roundtrip video content path 111 of exemplary multimedia conferencing system 100.

The conferencing mechanisms 102 are configured to support audio conferencing between the locations 101. The conferencing mechanisms 102 support audio conferencing in a manner for providing audio content from the first location $101_1$ to the second location $101_2$. The audio capture mechanism $106_1$ captures audio content at the first location $101_1$ and provides the captured audio content to computer $103_1$. The computer $103_1$ encodes the audio content, packetizes the encoded audio content, and transmits the packetized encoded audio content toward the second location $101_2$ via communication network 110. The computer $103_2$ receives the packetized encoded audio content from computer $103_1$ via communication network 110. The computer $103_2$ de-packetizes the packetized encoded audio content, decodes the encoded audio content, and propagates the audio content toward audio output mechanism $107_2$ for presentation of the audio at second location $101_2$. This is depicted in FIG. 1 as audio content path $112_{12}$. The conferencing mechanisms 102 also support audio conferencing in a manner for providing audio content from the second location $101_2$ to the first location $101_1$ using a process mirroring that described for providing audio content from the first location $101_1$ to the second location $101_2$ (namely, audio content captured by audio capture mechanism $106_2$ is propagated to audio output mechanism $107_1$ via computer $103_2$, communication network 110, and computer $103_1$). This is depicted in FIG. 1 as audio content path $112_{21}$. The audio content path $112_{12}$ and the audio content path $112_{21}$ represent a roundtrip audio content path 112 of exemplary multimedia conferencing system 100.

It will be appreciated that, although primarily depicted and described with respect to specific types and arrangements of conferencing mechanisms 102 having specific types and arrangements of elements, the conferencing mechanisms 102 may be implemented in any other manner that is suitable for supporting multimedia conferencing between locations 101 via communication network 110.

As will be appreciated from the description of multimedia conferencing provided by conferencing mechanisms 102, there are many types of delays that are introduced in the path of a content signal (e.g., video signal or audio signal) due to various types of hardware and software operating in the path of the content signal, such that the end-to-end delays experienced by the users of multimedia conferencing are difficult to characterize and measure. The actual delay experienced by the users of multimedia conferencing is indicative as to the level of quality of the interactive experience of the users. For example, moderate delay (e.g., 300-500 ms in each direction) may result in a negative experience for the users, while significant delay (e.g., greater than 500 ms in each direction) may cause the interaction between the users to become half-duplex (e.g., where only one user may speak at a time). Thus, in at least some embodiments, a capability is provided for externally measuring the roundtrip latency of a roundtrip content path in a communication system.

In at least some embodiments, a capability is provided for externally measuring the video delay experienced by users of exemplary multimedia conferencing system 100. In at least some embodiments, a capability is provided for externally measuring the roundtrip latency of the roundtrip video content path 111. In at least some embodiments, measurement of roundtrip latency of roundtrip video content path 111 is performed using a video latency measurement mechanism 120 at first location $101_1$ and, optionally, a video reflection mechanism 122 at second location $101_2$.

The video latency measurement mechanism 120 is configured to generate a visual event. The video latency measurement mechanism 120 is configured to record a time (denoted as time $T_1$) associated with generation of the visual event. The video latency measurement mechanism 120 is arranged with respect to video capture mechanism $104_1$ such that the visual event is captured by video capture mechanism $104_1$ and, thus, is propagated to second location $101_2$ as part of the video content via video content path $111_{12}$. The video content including the visual event is presented at second location $101_2$ via video presentation mechanism $105_2$. The video content including the visual event is directed from video presentation mechanism $105_2$ back into video capture mechanism $104_2$ (e.g., by moving one or both of video capture mechanism $104_2$ or video presentation mechanism $105_2$, arranging video reflection mechanism 122 with respect to video presentation mechanism $105_2$ and video capture mechanism $104_2$ such that the video content including the visual event is reflected from video presentation mechanism $105_2$ back into video capture mechanism $104_2$, or the like). As a result, the video content including the visual event is propagated from the second location $101_2$ back to the first location $101_1$ as part of the video content via video content path $111_{21}$. The video content including the visual event is presented via video presentation mechanism $105_1$. In this manner, the visual event traverses roundtrip video content path 111 such that video latency measurement mechanism 120 is able to determine the roundtrip latency of roundtrip video content path 111. The video latency measurement mechanism 120 is arranged with respect to video presentation mechanism $105_1$ such that the video content including the visual event is monitored by video latency measurement mechanism 120 and, thus, presence of the visual event within the video content may be detected by video latency measurement mechanism 120. The video latency measurement mechanism 120 is configured to detect the visual event within the video content presented via video presentation mechanism $105_1$. The video latency measurement mechanism 120 is configured to record a time (denoted as time $T_2$) associated with detection of the visual event. The video latency measurement mechanism 120 is configured to compute the roundtrip latency of the roundtrip video content path 111 based on a difference between the time associated with generation of the visual event and the time associated with detection of the visual event (e.g., $T_2-T_1$).

The video latency measurement mechanism 120 is configured to generate the visual event. The visual event may be any type of visual event suitable for use in measuring the roundtrip latency of the roundtrip video content path 111. The visual event may be a unique, well-defined event (e.g., so as to aid in detection of the visual event by the video latency measurement mechanism 120). The visual event may include display of a recognizable object, display of a recognizable shape (e.g., square, rectangle, triangle, or the like), display of a recognizable shape having a recognizable color (e.g., one of the primary colors, a secondary color, or the like), display of a Quick Response (QR) code, generation of a pulse of a light, streaming of a depiction of a timer, or the like, as well as various combinations thereof. The visual event, as noted above, may be presented in any suitable manner (e.g., displayed or generated for a fixed duration, streamed, or the like). The visual event, when displayed or generated for a fixed duration, may have a relatively short duration (e.g., of sufficient duration to ensure detection of the visual event, but short enough relative to the expected roundtrip latency such that computation of the roundtrip latency is not unduly impacted). The visual event may be any other type of visual event which may be generated and detected as discussed herein.

The video latency measurement mechanism 120 is configured to detect the visual event. The detection of the visual event depends on the characteristics of the visual event generated by video latency measurement mechanism 120. For example, where the visual event is a display of a recognizable object, the video latency measurement mechanism 120 may be configured to monitor a video stream for inclusion of the object. For example, where the visual event is a display of a shape having a particular color, the video latency measurement mechanism 120 may be configured to monitor a video stream for inclusion of the shape having the particular color. For example, where the visual event is generation of a flash of light, the video latency measurement mechanism 120 may be configured to monitor a video stream for detection of the flash of light. Thus, the detection of the visual event by video latency measurement mechanism 120 is configured based on the generation of the visual event by video latency measurement mechanism 120.

The characteristics of the visual event, including the manner in which the visual event is generated and detected, may depend on the manner in which video latency measurement mechanism 120 is implemented or the manner in which the video reflection mechanism 122 is implemented (or, similarly, implementation of video latency measurement mechanism 120 or implementation of video reflection mechanism 122 may depend on one or more of at least one characteristic of the visual event, the manner in which the visual event is to be generated, the manner in which the visual event is to be detected, or the like, as well as various combinations thereof.

The video latency measurement mechanism 120 and the video reflection mechanism 122 may be implemented in a number of ways.

The video latency measurement mechanism 120 may be implemented using one or more devices, modules, elements, or the like, as well as various combinations thereof.

In at least some embodiments, video latency measurement mechanism 120 may be a computing device supporting a video presentation mechanism (e.g., a display) for presenting the visual event, a video capture mechanism (e.g., a video camera) for capturing the visual event, and a processor and a memory for controlling generation of the visual event, detection of the visual event, and computation of the roundtrip latency of the roundtrip video content path 111. For example, video latency measurement mechanism 120 may be a tablet computer, a smartphone, or the like. In at least some embodiments, video latency measurement mechanism 120 may include an application running on a computing device, where the application is configured to control generation of the visual event, detection of the visual event, computation of the roundtrip latency of the roundtrip video content path 111, and, optionally, one or more other functions related to measurement of the roundtrip latency of the roundtrip video content path 111.

In at least some embodiments, video latency measurement mechanism 120 may include a light emitting device (e.g., light emitting diode (LED, laser, or the like) for generating and presenting the visual event, a light detecting device (e.g., a photodetector or other suitable device) for detecting the visual event, and a computing device configured to control generation of the visual event, detection of the visual event, and computation of the roundtrip latency of the roundtrip video content path 111.

In at least some embodiments, video latency measurement mechanism 120 may include one or more devices or components configured to (1) generate and present a time-based event that changes over time (e.g., a counting clock, a changing QR code where the information encoded within the QR code represents time on a clock and changes in a manner that represents changing of the time on the clock, or the like), (2) capture an image that includes a depiction of the generated version of the time-based event that is to be propagated from the first location $101_1$ to the second location $101_2$ and a depiction of a reflected version of the time-based event that is received at the first location $101_1$ from second location $101_2$, and (3) compute the roundtrip latency of the roundtrip video content path 111 as a difference between the two times depicted in the captured image.

In at least one embodiment for using streaming of a time-based event to compute roundtrip latency of the roundtrip video content path 111, a computing device is configured to generate the time-based event, present the generated version of the time-based event via a presentation interface, capture a reflected version of the time-based event via a content capture mechanism, present the reflected version of the time-based via the presentation interface, capture an image that includes depictions of the generated version of the time-based event and the reflected version of the time-based event (e.g., via a screen capture operation to capture the image displayed via the presentation interface), and compute the roundtrip latency of the roundtrip video content path 111 as a difference between the two times depicted in the captured image.

In at least one embodiment for using streaming of a time-based event to compute roundtrip latency of the roundtrip video content path 111, a computing device is configured to generate the time-based event and present the generated version of the time-based event via a presentation interface and an image capture device is configured to capture an image that includes a depiction of the time-based event presented via the computing device and a depiction of a reflected version of the time-based event that is presented via video presentation mechanism $105_1$ at first location $101_1$. The roundtrip latency of the roundtrip video content path 111 may then be computed (e.g., by the computing device or another device) as a difference between the two times depicted in the captured image.

It will be appreciated that the video latency measurement mechanism 120 may be implemented in various other ways.

The video reflection mechanism 122 may be implemented using one or more devices, modules, elements, or the like, as well as various combinations thereof.

In at least some embodiments, video reflection mechanism 122 may be an optical reflector (e.g., a mirror). The optical reflector may be held in place by a user, held in place mechanically, or the like.

In at least some embodiments, video reflection mechanism 122 may be a computing device supporting a video capture mechanism for capturing the video content including the visual event (e.g., a video camera) and a video output mechanism for outputting the video content including the visual event (e.g., a video presentation interface).

It will be appreciated that the video reflection mechanism 122 may be implemented in various other ways.

Figure 2:
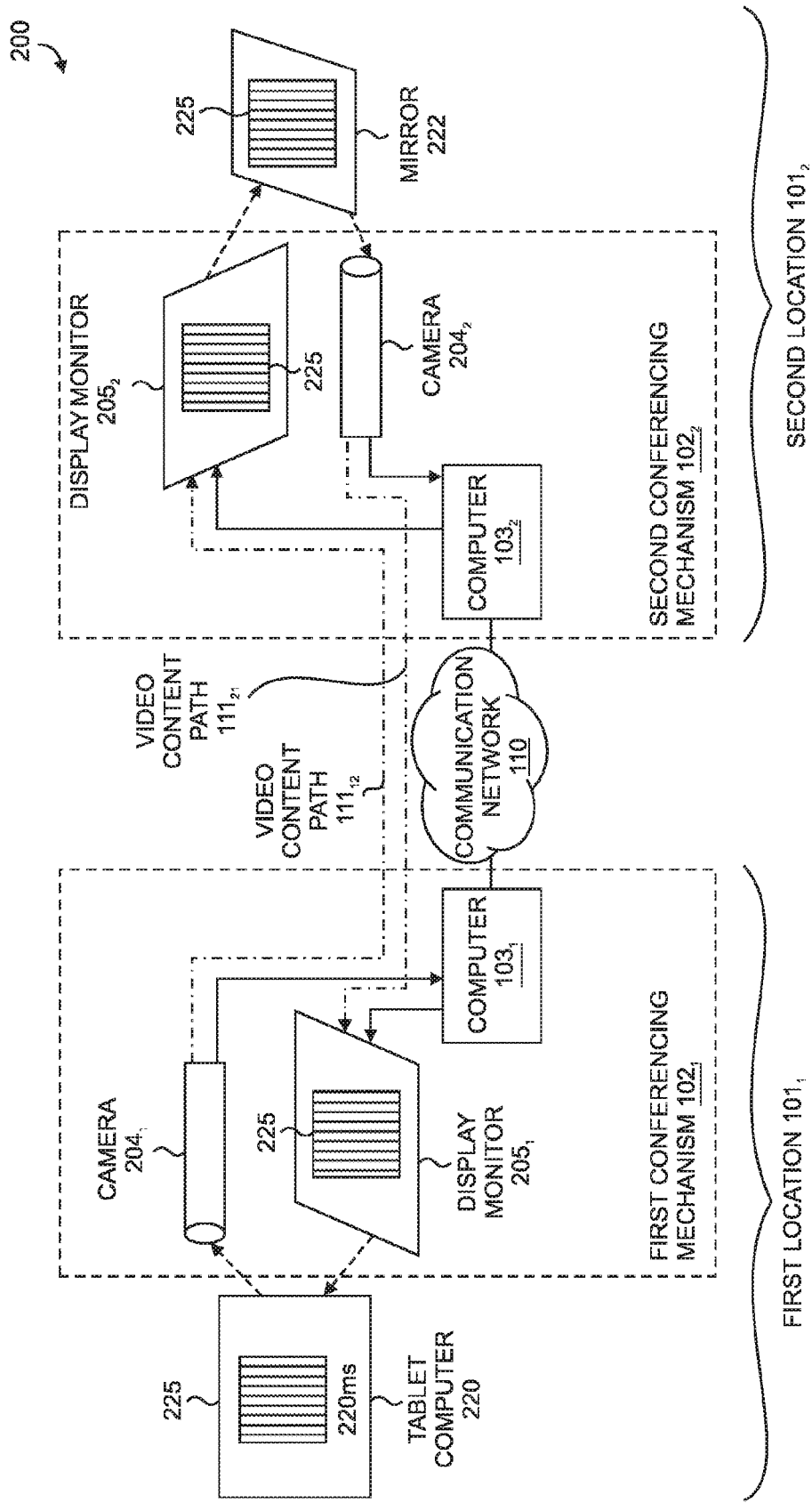
FIG. 2 depicts an exemplary embodiment of a video conferencing portion of FIG. 1, illustrating use of a tablet computer to generate a visual event, detect the visual event, and compute a roundtrip latency of a video content path.
Figure 3:
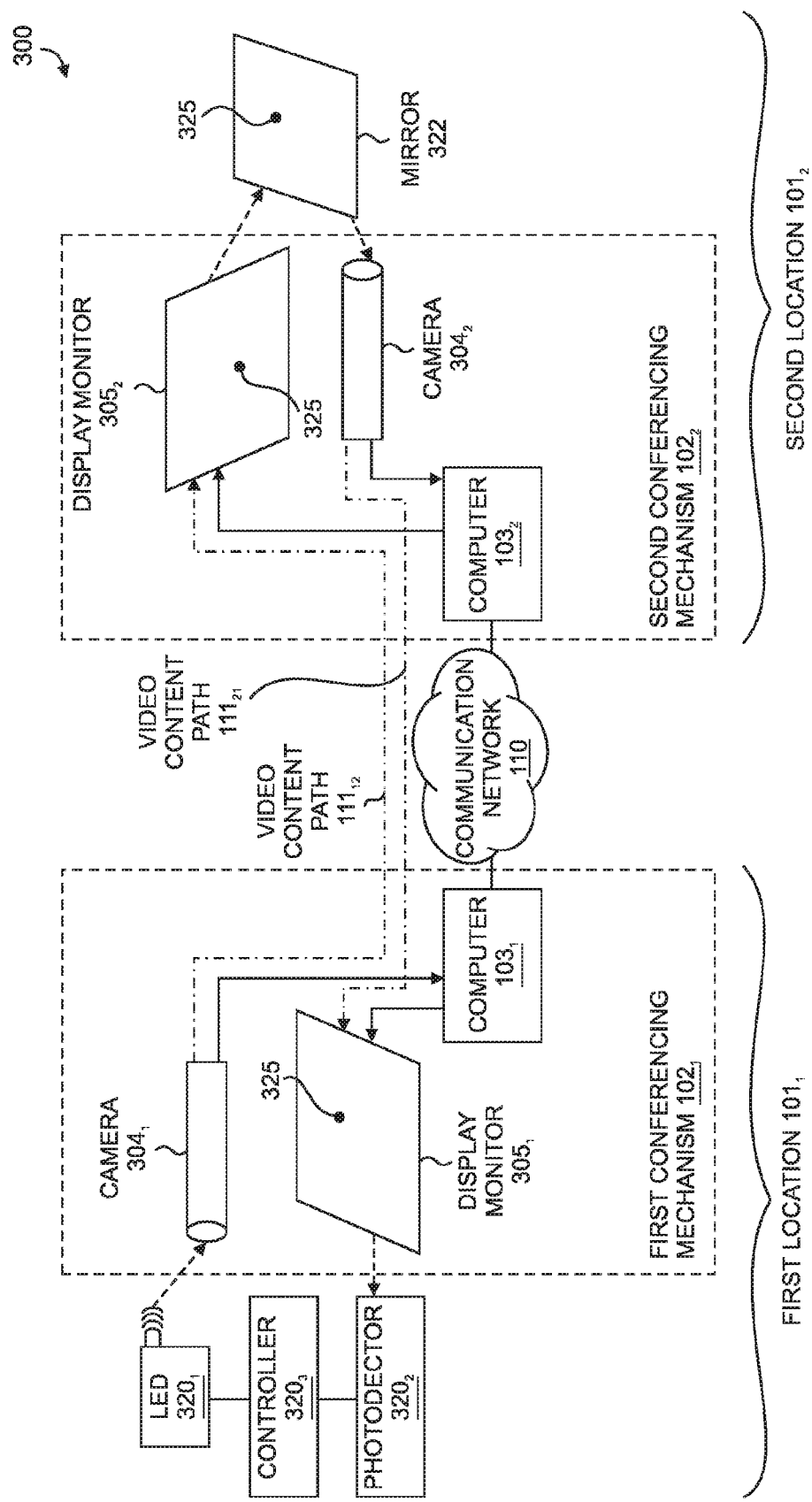
FIG. 3 depicts an exemplary embodiment of a video conferencing portion of FIG. 1, illustrating use of a light emitting device to generate a visual event, a light detecting device to detect the visual event, and a computing device to compute a roundtrip latency of a video content path.
Figure 4:
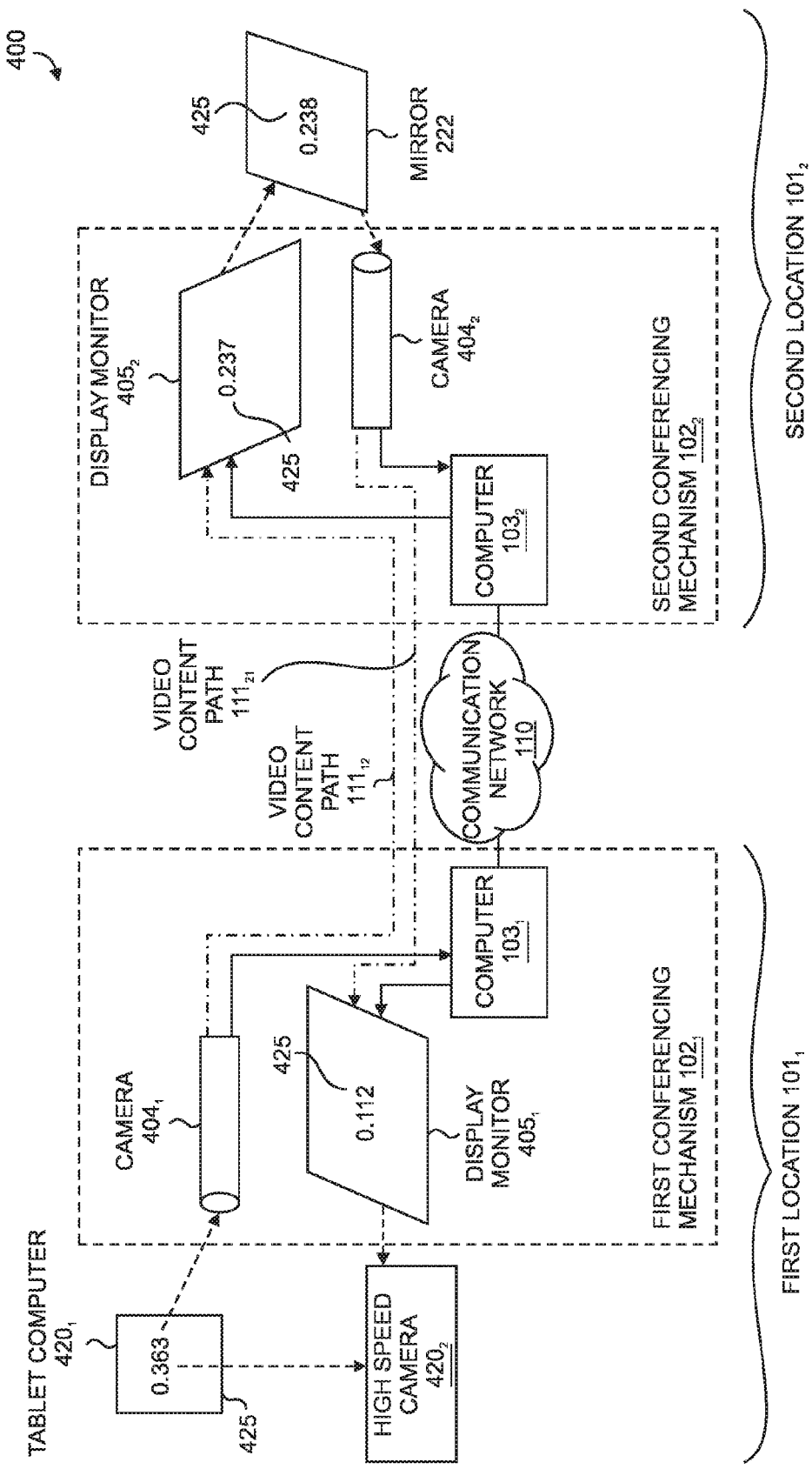
FIG. 4 depicts an exemplary embodiment of a video conferencing portion of FIG. 1, illustrating use of an image generating device to generate a time-based visual event and a computing device to compute a roundtrip latency of a video content path based on an image depicting two versions of the time-based visual event.

Exemplary embodiments of video latency measurement mechanism 120 and video reflection mechanism 122, as well as associated visual events, are depicted and described with respect to FIGS. 2-4.

FIG. 2 depicts an exemplary embodiment of a video conferencing portion of FIG. 1, illustrating use of a tablet computer to generate a visual event, detect the visual event, and compute a roundtrip latency of a video content path. As depicted in exemplary embodiment 200 of FIG. 2, video capture mechanisms $104_1$ and $104_2$ are cameras $204_1$ and $204_2$, video presentation mechanisms $105_1$ and $105_2$ are display monitors $205_1$ and $205_2$, video latency measurement mechanism 120 is a tablet computer 220, and video reflection mechanism 122 is a mirror 222. The tablet computer 220 generates an image of a square 225 having a primary color (indicated by cross-hatching which, illustratively, represents the color red). The tablet computer 220 records a time ($T_1$) associated with generation of the square 225. The tablet computer 220 includes a display interface and the square 225 is displayed via the display interface. The square 225 is captured by camera $204_1$ and provided to computer $103_1$ as part of the video content provided from camera $204_1$ to computer $103_1$. The computer $103_1$ propagates the video content including square 225 to computer $103_2$ via communication network 110. The computer $103_2$ provides the video content including square 225 to display monitor $205_2$. The display monitor $205_2$ displays the video content including square 225. The mirror 222 reflects the video content including square 225 such that the video content including square 225 is captured by camera $204_2$ and provided to computer $103_2$ as part of the video content provided from camera $204_2$ to computer $103_2$. The computer $103_2$ propagates the video content including square 225 to computer $103_1$ via communication network 110. The computer $103_1$ provides the video content including square 225 to display monitor $205_1$. The display monitor $205_1$ displays the video content including square 225. The tablet computer 220 includes a camera and the video content including square 225 is captured via the camera. The tablet computer 220 includes image recognition capabilities for detecting the square 225 within the video content captured from display monitor 205$_1$. The tablet computer 220 detects the square 225 within the video content captured from display monitor 205$_1$. The tablet computer 220 records a time (T$_2$) associated with detection of the square 225. The tablet computer 220 computes a roundtrip latency as a difference between the time associated with generation of square 225 and the time associated with detection of square 225 (e.g., T$_2$−T$_1$). The tablet computer 220 presents the roundtrip latency via the display interface of tablet computer 220 (illustratively, 220 ms in this example).

FIG. 3 depicts an exemplary embodiment of a video conferencing portion of FIG. 1, illustrating use of a light emitting device to generate a visual event, a light detecting device to detect the visual event, and a computing device to compute a roundtrip latency of a video content path. As depicted in exemplary embodiment 300 of FIG. 3, video capture mechanisms 104$_1$ and 104$_2$ are cameras 304$_1$ and 304$_2$, video presentation mechanisms 105$_1$ and 105$_2$ are display monitors 305$_1$ and 305$_2$, video latency measurement mechanism 120 is a combination of video latency measurement devices 320, and video reflection mechanism 122 is a mirror 322. The video latency measurement devices 320 include an LED 320$_1$ configured for generating the visual event, a photodetector 320$_2$ configured to detecting the visual event, and a controller 320$_3$ (which is communicatively connected to LED 320$_1$ and photodetector 320$_2$) configured for computing the roundtrip latency of roundtrip video content path 111. The LED 320$_1$ (e.g., under control of controller 320$_3$) generates a light pulse 325. The controller 320$_3$ records a time (T$_1$) associated with generation of the light pulse 325 by LED 320$_1$. The light pulse 325 is captured by camera 304$_1$ and provided to computer 103$_1$ as part of the video content provided from camera 304$_1$ to computer 103$_1$. The computer 103$_1$ propagates the video content including light pulse 325 to computer 103$_2$ via communication network 110. The computer 103$_2$ provides the video content including light pulse 325 to display monitor 305$_2$. The display monitor 305$_2$ displays the video content including light pulse 325. The mirror 322 reflects the video content including light pulse 325 such that the video content including light pulse 325 is captured by camera 304$_2$ and provided to computer 103$_2$ as part of the video content provided from camera 204$_2$ to computer 103$_2$. The computer 103$_2$ propagates the video content including light pulse 325 to computer 103$_1$ via communication network 110. The computer 103$_1$ provides the video content including light pulse 325 to display monitor 205$_1$. The display monitor 205$_1$ displays the video content including light pulse 325. The photodetector 320$_2$ detects the light pulse 325 in the video content displayed via display monitor 205$_1$. The controller 320$_3$ records a time (T$_2$) associated with detection of the light pulse 325 by photodetector 320$_2$. The controller 320$_3$ computes a roundtrip latency as a difference between the time associated with generation of light pulse 325 and the time associated with detection of light pulse 325 (e.g., T$_2$−T$_1$).

FIG. 4 depicts an exemplary embodiment of a video conferencing portion of FIG. 1, illustrating use of an image generating device to generate a time-based visual event and a computing device to compute a roundtrip latency of a video content path based on an image depicting two versions of the time-based visual event. As depicted in exemplary embodiment 400 of FIG. 4, video capture mechanisms 104$_1$ and 104$_2$ are cameras 404$_1$ and 404$_2$, video presentation mechanisms 105$_1$ and 105$_2$ are display monitors 405$_1$ and 405$_2$, video latency measurement mechanism 120 is a combination of a tablet computer 420$_1$ and a high-speed camera 420$_2$, and video reflection mechanism 122 is a mirror 422. The tablet computer 420$_1$ generates an image of a running clock 425 which continues to run throughout the length of the latency measurement process. The tablet computer 420$_1$ includes a display interface and the running clock 425 is displayed via the display interface. The running clock 425 is captured by camera 404$_1$ and provided to computer 103$_1$ as part of the video content provided from camera 404$_1$ to computer 103$_1$. The computer 103$_1$ propagates the video content including running clock 425 to computer 103$_2$ via communication network 110. The computer 103$_2$ provides the video content including running clock 425 to display monitor 405$_2$. The display monitor 405$_2$ displays the video content including running clock 425. The mirror 422 reflects the video content including running clock 425 such that the video content including running clock 425 is captured by camera 404$_2$ and provided to computer 103$_2$ as part of the video content provided from camera 404$_2$ to computer 103$_2$. The computer 103$_2$ propagates the video content including running clock 425 to computer 103$_1$ via communication network 110. The computer 103$_1$ provides the video content including running clock 425 to display monitor 405$_1$. The display monitor 405$_1$ displays the video content including running clock 425. The high speed camera 420$_2$ captures an image including a depiction of running clock 425 as it is displayed on tablet computer 420$_1$ (where the associated time is denoted as T$_1$) and a depiction of running clock 425 as it is displayed on display monitor 405$_1$ after traversing the roundtrip video content path 111 (where the associated time is denoted as T$_2$). The roundtrip time may then be computed as a difference between the two times depicted in the image captured by high speed camera 420$_2$ (e.g., T$_2$−T$_1$). The example of FIG. 4 illustrates different times of the running clock 425 at the different display points at which the running clock 425 is displayed (illustratively, at the time at which the image is captured by high speed camera 420$_2$, times of 0.363 s, 0.238, 0.237, and 0.112 appear on display monitor 205$_1$, mirror 422, display monitor 405$_2$, and tablet computer 420$_1$, respectively, such that the roundtrip delay for this example is 0.363 s−0.112 s=251 ms).

Referring back to FIG. 1, it will be appreciated that, in at least some embodiments, video latency measurement mechanism 120 also may support one or more other functions related to computation of roundtrip latency of the roundtrip video content path 111.

In at least some embodiments, video latency measurement mechanism 120 may be configured to handle the computed roundtrip latency of the roundtrip video content path 111 in one or more ways. For example, video latency measurement mechanism 120 may be configured to store the roundtrip latency value in memory, present the roundtrip latency value via a presentation interface, aggregate the roundtrip latency value with one or more other roundtrip latency values for use in generating one or more associated results, transmit the roundtrip latency value toward at least one other device (e.g., a management system managing communication network 110), or the like, as well as various combinations thereof. The various ways in which round trip latency information may be handled and used will be understood by one skilled in the art and informed by the teachings herein.

In at least some embodiments, video latency measurement mechanism 120 may be configured to correct for one or more events which may adversely impact computation of the roundtrip latency of the roundtrip video content path 111. For example, video latency measurement mechanism 120 may be configured to correct for one or more of processing delay associated with generation and outputting of the visual event by the video latency measurement mechanism 120, delay associated with reflection of the visual event at second location $101_2$, processing delay associated with detection of the visual event by the video latency measurement mechanism 120, or the like. It will be appreciated that at least some such delay times may be known from one or more of historical information, statistical information, or the like. It will be appreciated that at least some such delay times may be determined based on one or more of information indicative of one or more characteristics of the visual event, information indicative of the type of implementation of the video latency measurement mechanism 120 (e.g., brand and model of computer used, type of processor used, or the like), or the like, as well as various combinations thereof. It will be appreciated that such corrections may be performed by subtracting such delay times from the initial roundtrip latency of the roundtrip video content path 111.

The video latency measurement mechanism 120 may support various other functions related to computation of roundtrip latency of the roundtrip video content path 111.

In at least some embodiments, a capability is provided for externally measuring the audio delay experienced by users of exemplary multimedia conferencing system 100. In at least some embodiments, a capability is provided for externally measuring the roundtrip latency of the roundtrip audio content path 112. In at least some embodiments, measurement of roundtrip latency of roundtrip audio content path 112 is performed using an audio latency measurement mechanism 130 at first location $101_1$ and an aural event conversion mechanism 132 at second location $101_2$.

The audio latency measurement mechanism 130 is configured to generate an aural event having a first set of aural characteristics associated therewith. The audio latency measurement mechanism 130 is configured to record a time (denoted as time $T_1$) associated with generation of the aural event. The aural event is captured by audio capture mechanism $106_1$ and, thus, is propagated to second location $101_2$ as part of the audio content via audio content path $112_{12}$. The audio content including the aural event is presented at second location $101_2$ via audio output mechanism $107_2$. The audio content including the aural event is received by aural event conversion mechanism 132. The aural event conversion mechanism 132 processes the aural event in a manner for modifying the aural event (e.g., modifying at least one aural characteristic of the first set of aural characteristics to produce a second set of aural characteristics for the aural event). The processing of the aural event in a manner for modifying the aural event is performed in order to prevent the aural event from being filtered at the second location $101_2$ (e.g., existing audio capture mechanisms typically support robust echo cancellation and cross-talk cancellation capabilities which might otherwise filter the aural event if the aural event were to be propagated back toward first location $101_1$ without being modified). The aural event conversion mechanism 132 outputs the aural event having the second set of aural characteristics associated therewith. The aural event is captured by audio capture mechanism $106_2$ and, thus, is propagated from second location $101_2$ back to first location $101_1$ as part of the audio content via audio content path $112_{21}$. The audio content including the aural event is presented at first location $101_1$ via audio output mechanism $107_1$. In this manner, the aural event traverses roundtrip audio content path 112 such that audio latency measurement mechanism 130 is able to determine the roundtrip latency of roundtrip audio content path 112. The audio content including the aural event is received by audio latency measurement mechanism 130. The audio latency measurement mechanism 130 is configured to detect the aural event within the audio content output by audio output mechanism $107_1$. The audio latency measurement mechanism 130 is configured to detect the aural event having the second set of aural characteristics (e.g., the audio latency measurement mechanism 130 has advanced knowledge regarding the audio processing to be performed by aural event conversion mechanism 132). The audio latency measurement mechanism 130 is configured to record a time (denoted as time $T_2$) associated with detection of the aural event. The audio latency measurement mechanism 130 is configured to compute the roundtrip latency of the roundtrip audio content path 112 based on a difference between the time associated with generation of the aural event and the time associated with detection of the aural event (e.g., $T_2-T_1$).

The audio latency measurement mechanism 130 is configured to generate the aural event. The aural event may be any type of aural event suitable for use in measuring the roundtrip latency of the roundtrip audio content path 112. The aural event may be a unique, well-defined event (e.g., so as to aid in detection of the aural event by the audio latency measurement mechanism 130). The aural event may be a relatively short (e.g., approximately 0.5 seconds-1 second, although it will be appreciated that other durations may be used) burst of pseudorandom noise. The relatively short burst of pseudorandom noise may be generated from a maximum length sequence. It will be appreciated that this type of burst has a relatively flat spectrum and may be easily reproduced. The aural event may be any other type of aural event which may be generated and detected as discussed herein.

The audio latency measurement mechanism 130 is configured to detect the aural event. The detection of the aural event may depend on the aural characteristics of the aural event generated by audio latency measurement mechanism 130. The detection of the aural event may depend on the aural characteristics of the aural event produced by aural event conversion mechanism 132 (e.g., where aural event conversion mechanism 132 modifies the characteristics of the aural event). The audio latency measurement mechanism 130 may be configured to cross-correlate the received audio with the aural event (e.g., a relatively short burst of pseudorandom noise, as discussed above) and monitor the correlation results to detect a peak indicative that the aural event and the received audio coincide. Thus, the detection of the aural event by audio latency measurement mechanism 130 may be configured based on the generation of the aural event by audio latency measurement mechanism 130 and the modification of the aural event by aural event conversion mechanism 132.

The audio latency measurement mechanism 130 and the aural event conversion mechanism 132 each may be implemented in a number of ways.

The audio latency measurement mechanism 130 may be implemented using one or more devices, modules, elements, or the like, as well as various combinations thereof.

In at least some embodiments, audio latency measurement mechanism 130 may be a computing device supporting an audio output mechanism (e.g., one or more speakers) for outputting the aural event, an audio capture mechanism for capturing audio content including the aural event (e.g., a microphone), and a processor and a memory for controlling generation of the aural event, detection of the aural event, and computation of the roundtrip latency of the roundtrip audio content path 112. For example, audio latency measurement mechanism 130 may be a tablet computer, a smartphone, or the like. In at least some embodiments, audio latency measurement mechanism 130 may include an application running on a computing device, where the application is configured to control generation of the aural event, detection of the aural event, computation of the roundtrip latency of the roundtrip audio content path 112, and, optionally, one or more other functions related to measurement of the roundtrip latency of the roundtrip audio content path 112.

In at least some embodiments, audio latency measurement mechanism 130 may include an audio output device (e.g., one or more speakers) for outputting the aural event, an audio capture device (e.g., a microphone) for capturing audio including the aural event, and a computing device configured to control generation of the aural event, detection of the aural event, and computation of the roundtrip latency of the roundtrip audio content path 112.

It will be appreciated that the audio latency measurement mechanism 130 may be implemented in various other ways.

The aural event conversion mechanism 132 may be implemented using one or more devices, modules, elements, or the like, as well as various combinations thereof.

In at least some embodiments, aural event conversion mechanism 132 may be a computing device supporting an audio capture mechanism (e.g., a microphone) for capturing audio content including the aural event, an audio output mechanism (e.g., one or more speakers) for outputting the aural event, and a processor and a memory for controlling modification of the aural event from having the first set of aural characteristics to having the second set of aural characteristics. For example, aural event conversion mechanism 132 may be a tablet computer, a smartphone, or the like.

In at least some embodiments, aural event conversion mechanism 132 may include an audio capture mechanism (e.g., a microphone) for capturing audio content including the aural event, an audio output mechanism (e.g., one or more speakers) for outputting the aural event, and a computing device configured to control modification of the aural event from having the first set of aural characteristics to having the second set of aural characteristics.

It will be appreciated that the aural event conversion mechanism 132 may be implemented in various other ways.

Figure 5:
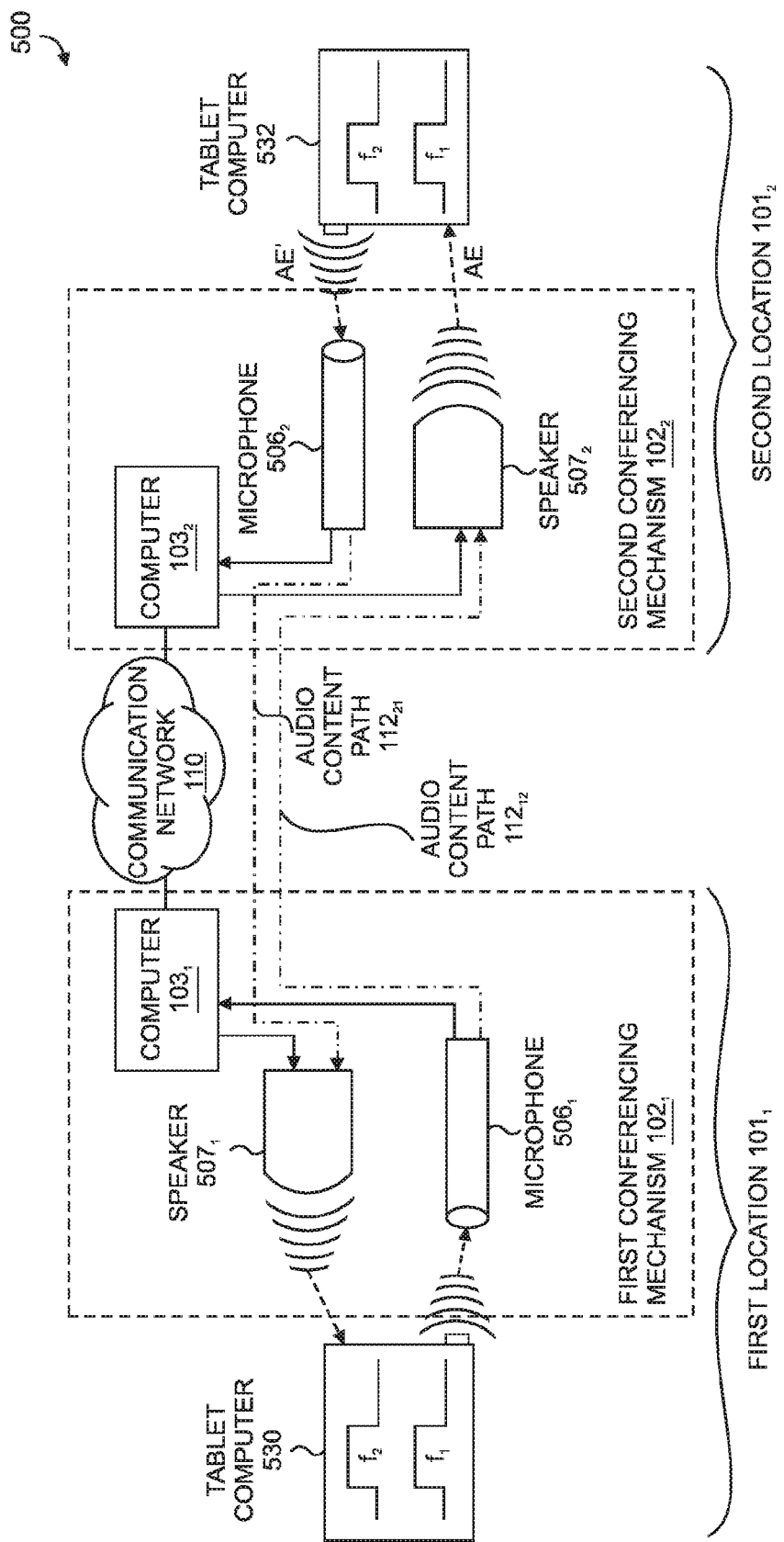
FIG. 5 depicts an exemplary embodiment of an audio conferencing portion of FIG. 1, illustrating use of a tablet computer to generate an audio event, detect the audio event, and compute a roundtrip latency of an audio content path.

An exemplary embodiment of audio latency measurement mechanism 130 and aural event conversion mechanism 122 is depicted and described with respect to FIG. 5.

FIG. 5 depicts an exemplary embodiment of an audio conferencing portion of FIG. 1, illustrating use of a tablet computer to generate an audio event, detect the audio event, and compute a roundtrip latency of an audio content path. As depicted in exemplary embodiment 500 of FIG. 5, audio capture mechanisms $106_1$ and $106_2$ are cameras $506_1$ and $506_2$, audio output mechanisms $107_1$ and $107_2$ are speakers $507_1$ and $507_2$, audio latency measurement mechanism 130 is a tablet computer 530, and aural event conversion mechanism 132 is a tablet computer 532. The tablet computer 530 generates a sound 535 at a first frequency (indicated by the audio profile and associated label $f_1$). The tablet computer 530 records a time ($T_1$) associated with generation of the sound 535. The tablet computer 530 includes a speaker and the sound 535 is played via the speaker. The sound 535 is captured by microphone $506_1$ and provided to computer $103_1$ as part of the audio content provided from microphone $506_1$ to computer $103_1$. The computer $103_1$ propagates the audio content including sound 535 to computer $103_2$ via communication network 110. The computer $103_2$ provides the audio content including sound 535 to speaker $507_2$. The speaker $507_2$ plays the audio content including sound 535. The tablet computer 532 includes a microphone and the sound 535 is received by the microphone. The tablet computer 532 processes sound 535 in a manner for modifying sound 535 from having the first frequency to having a second frequency (indicated by the audio profile and associated label $f_2$). The tablet computer 532 also includes a speaker and the modified sound 535 is played via the speaker. The modified sound 535 is captured by microphone $506_2$ and provided to computer $103_2$ as part of the audio content provided from microphone $506_2$ to computer $103_2$. The computer $103_2$ propagates the audio content including modified sound 535 to computer $103_1$ via communication network 110. The computer $103_1$ provides the audio content including modified sound 535 to speaker $507_1$. The speaker $507_1$ plays the audio content including modified sound 535. The tablet computer 530 also includes a microphone and the audio content including modified sound 535 is captured via the microphone. The tablet computer 530 includes audio recognition capabilities for detecting the modified sound 535 within the audio content captured from speaker $507_1$. The tablet computer 530 detects the modified sound 535 within the audio content captured from speaker $507_1$. The tablet computer 530 records a time ($T_2$) associated with detection of the modified sound 535. The tablet computer 530 computes a roundtrip latency as a difference between the time associated with generation of sound 535 and the time associated with detection of modified sound 535 (e.g., $T_2 - T_1$). The tablet computer 530 presents the roundtrip latency via the display interface of tablet computer 530 (illustratively, 184 ms in this example).

Referring back to FIG. 1, it will be appreciated that, in at least some embodiments, audio latency measurement mechanism 130 also may support one or more other functions related to computation of roundtrip latency of the roundtrip audio content path 112.

In at least some embodiments, audio latency measurement mechanism 130 may be configured to handle the computed roundtrip latency of the roundtrip audio content path 112 in one or more ways. For example, audio latency measurement mechanism 130 may be configured to store the roundtrip latency value in memory, present the roundtrip latency value via a presentation interface, aggregate the roundtrip latency value with one or more other roundtrip latency values for use in generating one or more associated results, transmit the roundtrip latency value toward at least one other device (e.g., a management system managing communication network 110), or the like, as well as various combinations thereof. The various ways in which round trip latency information may be handled and used will be understood by one skilled in the art and informed by the teachings herein.

In at least some embodiments, audio latency measurement mechanism 130 may be configured to correct for one or more events which may adversely impact computation of the roundtrip latency of the roundtrip audio content path 112. For example, audio latency measurement mechanism 130 may be configured to correct for one or more of processing delay associated with generation and outputting of the aural event by audio latency measurement mechanism 130, delay associated with modification of the aural event at second location $101_2$, processing delay associated with detection of the aural event by aural latency measurement mechanism 130, or the like. It will be appreciated that at least some such delay times may be known from one or more of historical information, statistical information, or the like. It will be appreciated that at least some such delay times may be determined based on one or more of information indicative of one or more characteristics of the aural event, information indicative of the type of implementation of the audio latency measurement mechanism 130 (e.g., brand and model of computer used, type of processor used, or the like), or the like, as well as various combinations thereof. It will be appreciated that such corrections may be performed by subtracting such delay times from the initial roundtrip latency of the roundtrip audio content path 112.

The audio latency measurement mechanism 130 may support various other functions related to computation of roundtrip latency of the roundtrip audio content path 112.

It will be appreciated that, although primarily depicted and described with respect to embodiments in which video latency measurement mechanism 120 and audio latency measurement mechanism 130 are both used within exemplary multimedia conferencing system 100, in at least some embodiments only video latency measurement mechanism 120 may be used (e.g., for a video conference without corresponding audio content, for a multimedia conference in which only roundtrip latency of the roundtrip video path is of interest, or the like) or only audio latency measurement mechanism 130 may be used (e.g., for an audio conference without corresponding video content, for a multimedia conference in which only roundtrip latency of the roundtrip audio path is of interest, or the like).

It will be appreciated that, although video latency measurement mechanism 120 and audio latency measurement mechanism 130 are primarily depicted and described independently (e.g., as independent implementations within exemplary multimedia conferencing system 100), in at least some embodiments video latency measurement mechanism 120 and audio latency measurement mechanism 130 may be implemented using one or more shared devices. For example, a single computing device may be used to implement both the video latency measurement mechanism 120 and audio latency measurement mechanism 130.

It will be appreciated that, although primarily depicted and described with respect to determining roundtrip latency for specific types of content (e.g., roundtrip latency for video content traversing roundtrip video content path 111 and roundtrip latency for audio content traversing roundtrip audio content path 112), in at least some embodiments various references herein to specific types of content may be generalized as determining roundtrip latency for content traversing a roundtrip content path). Accordingly, in at least some embodiments, references herein to video latency measurement mechanism 120 and audio latency measurement mechanism 130 may be read more generally as latency measurement mechanisms, references herein to visual and aural events may be read more generally as content events, or the like. This type of generalization may be applied to the various embodiments related to FIG. 1, and may be better understood by way of reference to FIG. 6.

Figure 6:
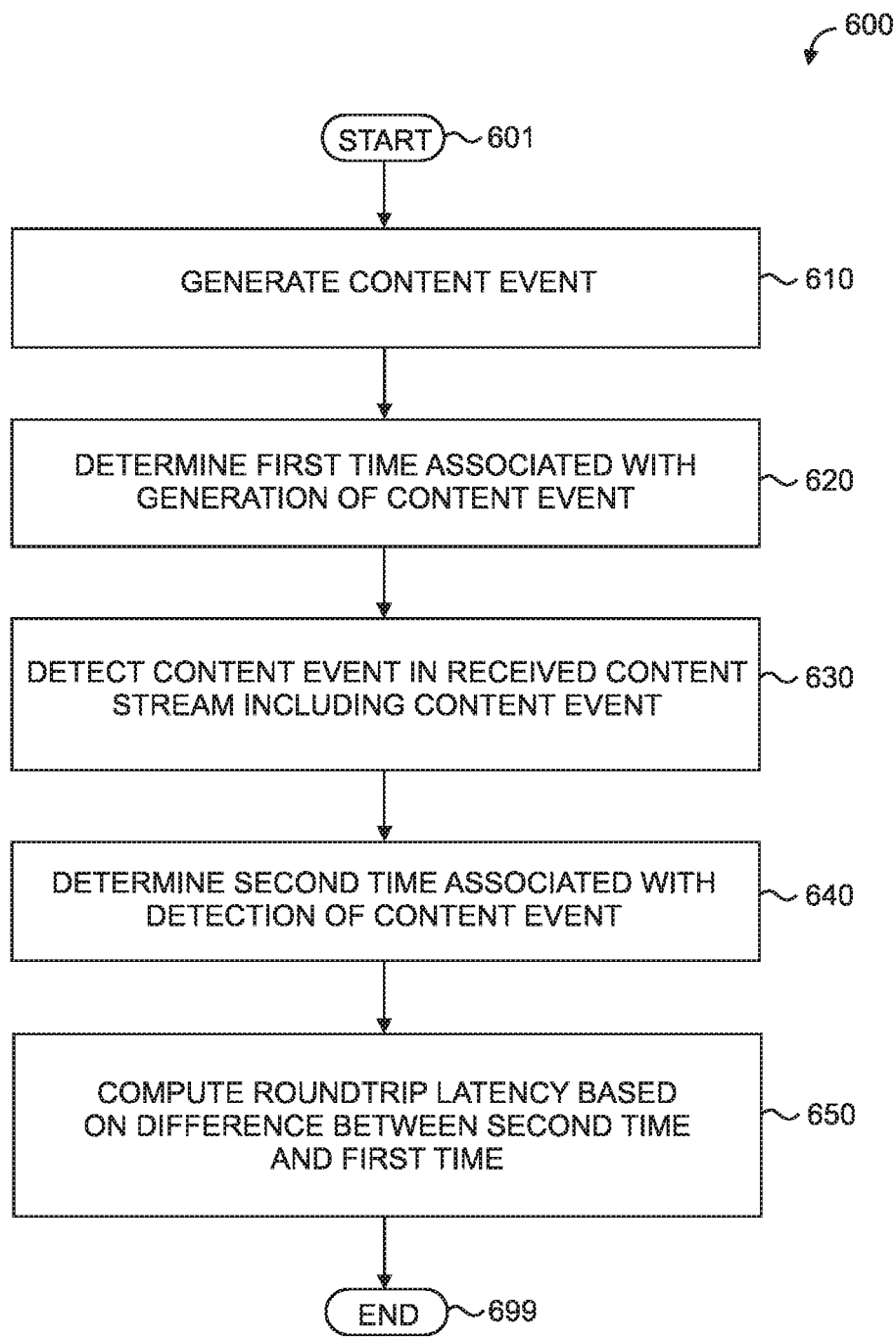
FIG. 6 depicts an exemplary embodiment of a method for use by a latency measurement mechanism to measure roundtrip latency of a content path.

FIG. 6 depicts an exemplary embodiment of a method for use by a latency measurement mechanism to measure roundtrip latency of a content path. It will be appreciated that, although primarily depicted and described as being performed serially, at least a portion of the steps of method 600 may be performed contemporaneously or in a different order than presented in FIG. 6. At step 601, method 600 begins. At step 610, a content event is generated. At step 620, a first time associated with generation of the content event is determined. At step 630, the content event is detected in a received content stream including the content event. At step 640, a second time associated with detection of the content event is determined. At step 650, a roundtrip latency is computed based on a difference between the first timestamp and the second timestamp. At step 699, method 600 ends. Various embodiments of method 600 of FIG. 6 may be better understood by way of reference to FIG. 1 and one or more of FIGS. 2-5.

Figure 7A:
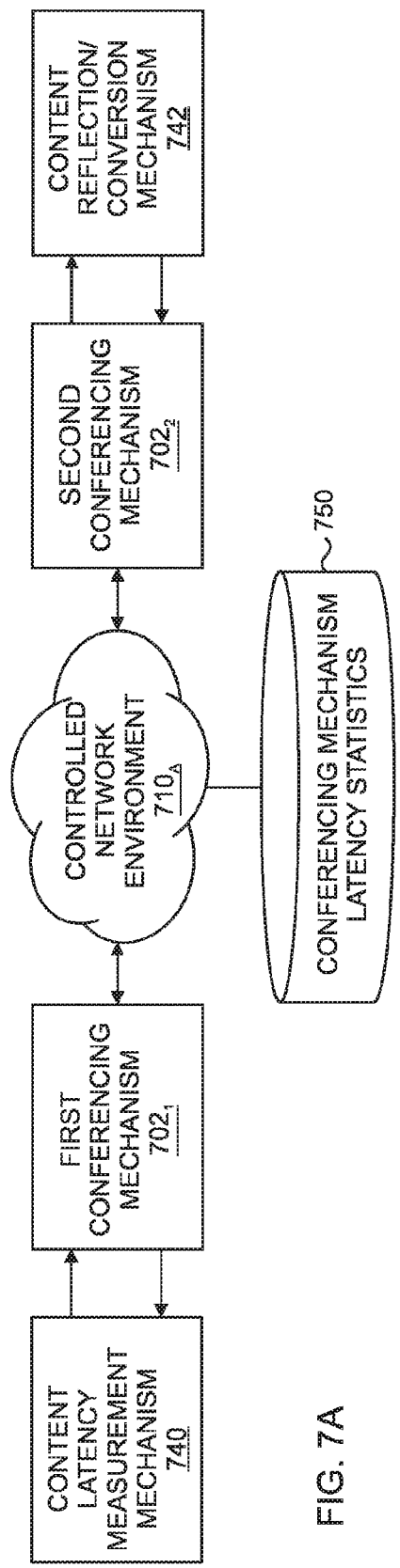
FIGS. 7A and 7B depict an exemplary embodiment for building a library of conferencing mechanism latency statistics based on a controlled network environment and for using the library of conferencing mechanism latency statistics to measure network latency in a communication network.
Figure 7B:
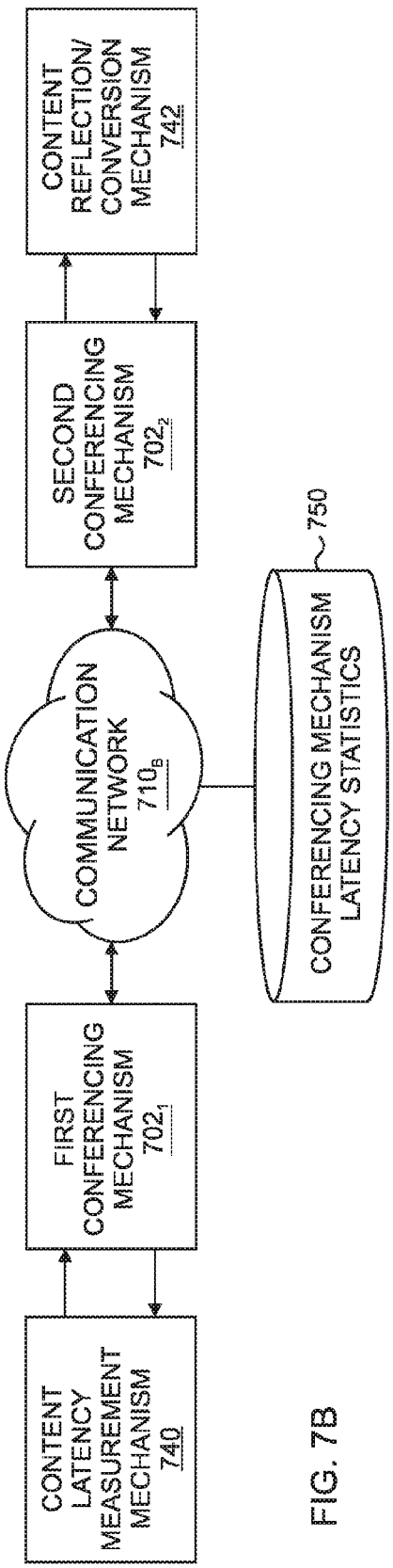

In at least some embodiments, the external roundtrip latency measurement capability may be used to build a library of conferencing mechanism latency statistics based on a controlled network environment and, further, to measure network latency in a communication network based on the library of conferencing mechanism latency statistics FIGS. 7A and 7B depict an exemplary embodiment for building a library of conferencing mechanism latency statistics based on a controlled network environment and for using the library of conferencing mechanism latency statistics to measure network latency in a communication network.

As depicted in FIGS. 7A and 7B, a first conferencing mechanism $702_1$ and a second conferencing mechanism $702_2$ may be deployed for communication via a controlled network environment $710_A$ (as depicted in FIG. 7A) and for communication via a communication network $710_B$ (as depicted in FIG. 7B). The first conferencing mechanism $702_1$ and second conferencing mechanism $702_2$ may correspond to the first conferencing mechanism $102_1$ and the second conferencing mechanism $102_2$ depicted and described with respect to FIG. 1. The controlled network environment $710_A$ is a network environment in which network delay is known or may be accurately measured (e.g., in a lab environment or any other suitable type of environment), The communication network $710_B$ may be any type of communication network in which network delay is unknown (e.g., the Internet, an enterprise network, or the like).

As further depicted in FIGS. 7A and 7B, a content latency measurement mechanism 740 and a content reflection/conversion mechanism 742 may be used, within the context of FIG. 7A or FIG. 7B, to perform latency measurements as depicted and described herein with respect to FIGS. 1-6. The content latency measurement mechanism 740 may correspond to the video latency measurement mechanism 120 or the audio latency measurement mechanism 130 of FIG. 1 and, similarly, the content reflection/conversion mechanism 742 may correspond to video reflection mechanism 132 or aural event conversion mechanism 132 of FIG. 1, respectively.

As further depicted in FIGS. 7A and 7B, a library of conferencing mechanism latency statistics 750 may be maintained such that it is accessible via controlled network environment $710_A$ (e.g., for use in populating statistics as the statistics are collected) or via communication network $710_B$ (e.g., for use in accessing statistics, such as when selecting one first conferencing mechanism $702_1$ or second conferencing mechanism $702_2$, when performing a network latency measurement on communication network $710_B$, or the like, as well as various combinations thereof). The library of conferencing mechanism latency statistics 750 may include various types of latency statistics at various levels of granularity. The latency statistics may include any suitable types of latency statistics (e.g., average latency, maximum latency, or the like, as well as various combinations thereof). The latency statistics may be provided at any suitable granularity. For example, latency statistics may be determined and maintained at the conferencing mechanism arrangement level for one or more arrangements of one or more types of conferencing mechanisms of one or more conferencing mechanism providers. For example, latency statistics may be determined and maintained at the conferencing mechanism type level for one or more types of conferencing mechanisms of one or more conferencing mechanism providers (e.g., average latency for a single arrangement of a given conferencing mechanism type, average latency across multiple potential arrangements of a given conferencing mechanism type, or the like, as well as various combinations thereof). For example, latency statistics may be determined and maintained at the conferencing mechanism provider level for one or more conferencing mechanism providers (e.g., average latency for the only conferencing mechanism offered by the conferencing mechanism provider, average latency across multiple types of conferencing mechanisms offered by the conferencing mechanism provider, or the like, as well as various combinations thereof). The library of conferencing mechanism latency statistics may include any other suitable type(s) of latency statistic(s). The library of conferencing mechanism latency statistics may provide latency statistics at any other suitable granularity.

Within the context of FIG. 7A, it is assumed that network latency of controlled network environment $710_A$ is known, but that the latency of the first conferencing mechanism $702_1$ and the second conferencing mechanism $702_2$ is not known. The known network latency of controlled network environment $710_A$ may be used in combination with all or part of a roundtrip latency measurement (e.g., as depicted and described herein with respect to one or more embodiments of one or more of FIGS. 1-6) in order to determine a latency associated with the first conferencing mechanism $702_1$ or a latency associated with the second conferencing mechanism $702_2$.

For example, if a roundtrip latency is measured based on generation and detection of a content event by content latency measurement mechanism 740 (as well as content reflection/conversion mechanism 742) and the total network delay of controlled network environment $710_A$ (in both directions of transmission) is known, the portion of the delay attributed to handling of the content event by the first conferencing mechanism $702_1$ and the second conferencing mechanism $702_2$ may be computed as a difference between the roundtrip latency and the total network delay. The portions of the delay attributed to handling of the content event by the first conferencing mechanism $702_1$ and the second conferencing mechanism $702_2$ may then be further attributed to the first conferencing mechanism $702_1$ and the second conferencing mechanism $702_2$ in any suitable manner.

For example, if a time at which a content event is generated by the content latency measurement mechanism 740 is known (denoted as time $T_G$), the network delay of the controlled network environment $710_A$ (i.e., between the output of first conferencing mechanism $702_1$ and the input of second conferencing mechanism $702_2$) is known (denoted as $T_N$), and a time at which the content event is received by the second conferencing mechanism $702_2$ is known (denoted as $T_R$), then the latency associated with handling of the content event by the first conferencing mechanism $702_1$ may be computed as $T_R - T_G - T_N$.

For example, if a time at which a content event generated by the content latency measurement mechanism 740 is output by the first conferencing mechanism $702_1$ to the controlled network environment $710_A$ is known (denoted as $T_O$), the network delay of the controlled network environment $710_A$ in both directions (i.e., between the output of first conferencing mechanism $702_1$ and the input of second conferencing mechanism $702_2$ and, similarly, between the output of second conferencing mechanism $702_2$ and the input of first conferencing mechanism $702_1$) is known (denoted as a total $T_N$), and a time at which the content event is received by the first conferencing mechanism $702_1$ via the controlled network environment $710_A$ is known (denoted as $T_R$), then the latency associated with handling of the content event by the first conferencing mechanism $702_1$ may be computed as $T_R - T_O - T_N$.

It will be appreciated that measurements of latency of conferencing mechanisms may be determined in other ways within the context of a controlled network environment such as controlled network environment $710_A$ of FIG. 7A.

It will be appreciated that such measurement may be repeated in order to determine an average latency of the first conferencing mechanism $702_1$ or an average latency of the second conferencing mechanism $702_2$. It also will be appreciated that, by repeating these types of measurements for one or more arrangements of one or more conferencing mechanism types of one or more conferencing mechanism providers, various latency statistics may be collected for population within the library of conferencing mechanism latency statistics 750

In this manner, embodiments of the external roundtrip latency measurement capability may be employed to collect the latency statistics which form the basis for the library of conferencing mechanism latency statistics 750.

Within the context of FIG. 7B, it is assumed that at least some conference mechanism latency information is known (e.g., the latency of the first conferencing mechanism $702_1$ or the latency of the second conferencing mechanism $702_2$, based on measurements obtained within the context of FIG. 7A and populated within the library of conferencing mechanism latency statistics 750), but that the network delay of communication network $710_B$ is not known. The known conference mechanism latency information may be used in combination with all or part of a roundtrip latency measurement (e.g., as depicted and described herein with respect to one or more embodiments of one or more of FIGS. 1-6) in order to determine one or more network latencies associated with the communication network $710_B$.

For example, if a roundtrip latency is measured based on generation and detection of a content event by content latency measurement mechanism 740 (as well as content reflection/conversion mechanism 742), the total latency of first conferencing mechanism $702_1$ (e.g., for handling of the content event in both directions of transmission) is known (e.g., from the library of conferencing mechanism latency statistics 750), and the total latency of second conferencing mechanism $702_2$ (e.g., for handling of the content event in both directions of transmission) is known (e.g., from the library of conferencing mechanism latency statistics 750), then the portion of the roundtrip latency attributed to communication network 710B may be determined as a difference between the roundtrip latency and the total latencies of the first conferencing mechanism $702_1$ and the second conferencing mechanism $702_2$.

For example, if a time at which a content event is generated by the content latency measurement mechanism 740 is known (denoted as time $T_G$), the latency of the first conferencing mechanism $702_1$ is known (denoted as time $T_1$), and a time at which the content event is received by the second conferencing mechanism $702_2$ is known (denoted as $T_R$), then the network latency associated with propagating of the content event from the first conferencing mechanism $702_1$ toward the second conferencing mechanism $702_2$ via the communication network $710_B$ may be computed as $T_R - T_G - T_1$.

In this manner, embodiments of the external roundtrip latency measurement capability may be employed to perform network latency measurements (given availability of the latency statistics which form the basis for the library of conferencing mechanism latency statistics 750).

It will be appreciated that such latency statistics (e.g., latency statistics of the library of conferencing mechanism latency statistics 750) may be used to provide a conferencing mechanism certification service, whereby providers of conferencing mechanisms may receive various types of certifications. The certifications may be provided at various levels of granularity (e.g., for one or more conferencing mechanisms of a conference mechanism provider, for the conferencing mechanism provider, or the like). The certifications may be provided generally or for specific types of statistics (e.g., conferencing mechanism X1 of company X is certified with an average latency of 0.098 seconds, arrangement A2 of conferencing mechanism Y3 of company Y is certified with a maximum latency of 0.112 seconds, or the like).

It will be appreciated that, although primarily depicted and described herein with respect to use of a time at which a content event is generated as the basis for computing roundtrip latency, the use of a time at which a content event is presented also may be used as a basis for computing roundtrip latency. In some embodiments, the content event generation time and the content event presentation time are the same (e.g., such as where a light is generated by a light emitting device). In other embodiments, however, the content event generation time and the content event presentation time may be different (e.g., such as where a visual event to be presented via a computing device is generated and then provided to a display interface of the computing device for presentation via the display interface, or where an aural event to be presented via a computing device is generated and then provided to a speaker(s) of the computing device for presentation via the speaker(s)). Thus, in at least some embodiments, references herein to generation of a content event may be read as presentation of a content event, and, similarly, references herein to a time at which a content event is generated may be read as a time at which a content event is presented. In at least some such embodiments in which the content event generation time and the content event presentation time may be different, the content latency measurement mechanism may be configured to use the time at which the content event is generated without correcting for the time difference, use the time at which the content event is generated while correcting for the time difference (e.g., based on information indicative of the delay between generation and presentation of the content event), or use the time at which the content event is presented (e.g., if it is possible to accurately capture such a time).

It will be appreciated that, although primarily depicted and described within the context of use of a single event to determine a single roundtrip latency, in at least some embodiments multiple events may be generated such that multiple roundtrip latencies may be determined. It will be appreciated that, in at least some embodiments in which multiple roundtrip latency measures are determined, additional latency information may be determined based on the multiple roundtrip latencies (e.g., average roundtrip latency, maximum roundtrip latency, or the like).

It will be appreciated that, although primarily depicted and described within the context of determining roundtrip latency information, the determined round trip latency information may be further handled in any suitable manner (e.g., stored in memory, presented via one or more video interfaces, signaled to one or more systems, or the like). The various ways in which round trip latency information may be handled and used will be understood by one skilled in the art and informed by the teachings herein.

It will be appreciated that, although primarily depicted and described with respect to embodiments for determining roundtrip latency for specific types of content (namely, video content and audio content), various embodiments depicted and described herein may be used for determining roundtrip latency for other suitable types of content which may be streamed via a communication network.

It will be appreciated that, although primarily depicted and described with respect to embodiments for determining roundtrip latency for a specific type of service (namely, for a multimedia conferencing service), various embodiments depicted and described herein may be used for determining roundtrip latency for other types of services in which one or more types of content may be exchanged between devices.

Figure 8:
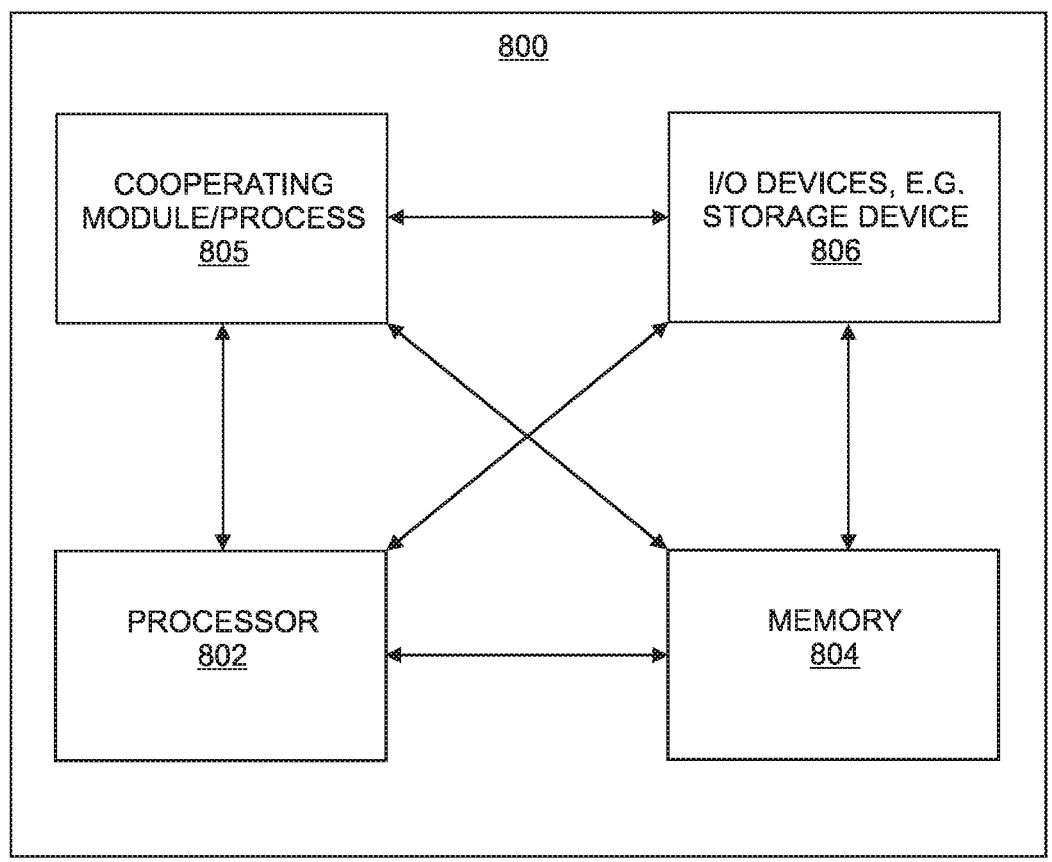
FIG. 8 depicts a high-level block diagram of a computer suitable for use in performing functions described herein.

FIG. 8 depicts a high-level block diagram of a computer suitable for use in performing functions described herein.

The computer 800 includes a processor 802 (e.g., a central processing unit (CPU) or other suitable processor(s)) and a memory 804 (e.g., random access memory (RAM), read only memory (ROM), and the like).

The computer 800 also may include a cooperating module/process 805. The cooperating process 805 can be loaded into memory 804 and executed by the processor 802 to implement functions as discussed herein and, thus, cooperating process 805 (including associated data structures) can be stored on a computer readable storage medium, e.g., RAM memory, magnetic or optical drive or diskette, and the like.

The computer 800 also may include one or more input/output devices 806 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 800 depicted in FIG. 8 provides a general architecture and functionality suitable for implementing functional elements described herein or portions of functional elements described herein. For example, computer 800 provides a general architecture and functionality suitable for implementing a conferencing mechanism 102, a computer 103, a video capture mechanism 104, a video presentation mechanism 105, an audio capture mechanism 106, an audio output mechanism 107, video latency measurement mechanism 120, video reflection mechanism 122, audio latency measurement mechanism 130, audio event conversion mechanism 132, or the like.

It will be appreciated that the functions depicted and described herein may be implemented in hardware or a combination of software and hardware, e.g., using a general purpose computer, via execution of software on a general purpose computer so as to provide a special purpose computer, using one or more application specific integrated circuits (ASICs) or any other hardware equivalents, or the like, as well as various combinations thereof.

It will be appreciated that at least some of the method steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods or techniques described herein are invoked or otherwise provided. Instructions for invoking the various methods may be stored in fixed or removable media, transmitted via a data stream in a broadcast or other signal bearing medium, or stored within a memory within a computing device operating according to the instructions.

It will be appreciated that the term "or" as used herein refers to a non-exclusive "or" unless otherwise indicated (e.g., "or else" or "or in the alternative").

It will be appreciated that, while the foregoing is directed to various embodiments of features present herein, other and further embodiments may be devised without departing from the basic scope thereof.

What is claimed is:

1. An apparatus, comprising:
   at least one module configured to:
      generate a content event, wherein the content event is a visual event, wherein the visual event comprises a depiction of at least one of a shape or an object; and
      detect the content event in a received content stream including the content event; and
   a processor and a memory configured to:
      determine a first time associated with generation of the content event and a second time associated with detection of the content event; and
      compute a roundtrip latency based on a difference between the second time and the first time.

2. The apparatus of claim 1, wherein the at least one module comprises at least one set of software instructions stored in the memory and executed by the processor.

3. The apparatus of claim 1, wherein the at least one module comprises a content presentation mechanism configured to present the generated content event and a content capture mechanism configured to capture the content stream including the content event.

4. The apparatus of claim 3, wherein the content presentation mechanism comprises a video presentation mechanism and the content capture mechanism comprises a video capture mechanism.

5. The apparatus of claim 1, wherein the apparatus is a computing device.

6. The apparatus of claim 5, wherein the computing device is a tablet computer or a smartphone.

7. The apparatus of claim 1, wherein the at least one module comprises:
   a light generating device communicatively connected to the processor and configured to generate a second content event; and
   a light detecting device communicatively connected to the processor and configured to detect the second content event.

8. The apparatus of claim 1, wherein the apparatus is configured to generate a time-based visual event, the apparatus further comprising:
   an image capture device configured to capture an image including a first depiction of the time-based visual event and a second depiction of the time-based visual event.

9. The apparatus of claim 8, wherein the time-based visual event comprises at least one of:
   a running timer; or
   a changing Quick Response (QR) code changing in a manner representing a running timer.

10. The apparatus of claim 1, wherein the at least one module is configured to generate an aural event.

11. The apparatus of claim 10, wherein the at least one module comprises an audio output mechanism configured to output the aural event and audio capture mechanism configured to capture the content stream including the aural event.

12. The apparatus of claim 10, wherein the at least one module is configured to detect the aural event in the content stream including the aural event.

13. The apparatus of claim 12, wherein the generated aural event has associated therewith a first set of aural characteristics and the detected aural event has associated therewith a second set of aural characteristics different than the first set of aural characteristics.

14. The apparatus of claim 12, wherein the aural event comprises a burst of pseudorandom noise.

15. The apparatus of claim 14, wherein the at least one module is configured to generate the burst of pseudorandom noise based on a maximum length sequence.

16. The apparatus of claim 14, the at least one module is configured to detect the burst of pseudorandom noise based on cross-correlation of the aural event with received audio content.

17. The apparatus of claim 1, wherein the at least one module is configured to detect the visual event based on an image recognition mechanism.

18. A non-transitory computer-readable storage medium storing instructions which, when executed by a processor, cause the processor to perform a method, the method comprising:
   generating a content event, wherein the content event is a visual event, wherein the visual event comprises a depiction of at least one of a shape or an object;
   detecting the content event in a received content stream including the content event;
   determining a first time associated with generation of the content event and a second time associated with detection of the content event; and
   computing a roundtrip latency based on a difference between the second time and the first time.

19. An apparatus configured to process an aural event, the apparatus comprising:
   a processor and a memory communicatively connected to the processor, the processor configured to:
      receive an audio stream including the aural event, the received aural event having a first set of aural characteristics;
      detect, within the received audio stream, the received aural event having the first set of aural characteristics;
      process the received aural event having the first set of aural characteristics for modifying the first set of aural characteristics to produce a second set of aural characteristics, wherein processing the received aural event having the first set of aural characteristics for modifying the first set of aural characteristics to produce the second set of aural characteristics modifies the aural event for preventing filtering of the aural event; and
      output the processed aural event having the second set of aural characteristics.

* * * * *